(12) United States Patent
Saga

(10) Patent No.: US 7,414,806 B2
(45) Date of Patent: Aug. 19, 2008

(54) INFORMATION RECORDING AND REPRODUCING APPARATUS WITH POWER SUPPLY VOLTAGE MONITORING FUNCTION

(75) Inventor: Hideki Saga, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 287 days.

(21) Appl. No.: 11/144,233

(22) Filed: Jun. 2, 2005

(65) Prior Publication Data

US 2005/0270682 A1   Dec. 8, 2005

(30) Foreign Application Priority Data

Jun. 4, 2004   (JP)   ............................. 2004-167406

(51) Int. Cl.
  *G11B 15/18*   (2006.01)
  *G11B 21/02*   (2006.01)
(52) U.S. Cl. ........................................................ 360/69
(58) Field of Classification Search .................. None
  See application file for complete search history.

(56) References Cited

U.S. PATENT DOCUMENTS 4,827,205 A * 5/1989 Hafner, Jr. et al. .......... 323/281

6,622,252 B1 * 9/2003 Klaassen et al. ............ 713/320
2005/0200998 A1 * 9/2005 Rowan ......................... 360/69

FOREIGN PATENT DOCUMENTS

| JP | 06-119708 | 4/1994 |
|---|---|---|
| JP | 10-069702 | 3/1998 |
| JP | 2000-323219 | 11/2000 |
| JP | 2003-173638 | 6/2003 |
| JP | 2003-189676 | 7/2003 |
| JP | 2003-242673 | 8/2003 |

* cited by examiner

*Primary Examiner*—Jake Olson
(74) *Attorney, Agent, or Firm*—Townsend and Townsend and Crew LLP; Patrick Duncan

(57) ABSTRACT

Embodiments of the invention reduce the peak consumption current of a disk drive and that of its application system, and to minimize the limitation of the consumption current so that the performance deterioration of the disk drive and its application system is minimized. In one embodiment, a monitor terminal is provided to enter the pre-regulated output voltage of the voltage constant power supply. The disk drive is controlled so as to suppress the currents consumed by individual sections in the disk drive if the monitored voltage falls to a predetermined reference voltage.

16 Claims, 6 Drawing Sheets

INFORMATION RECORDING AND REPRODUCING APPARATUS WITH POWER SUPPLY VOLTAGE MONITORING FUNCTION

CROSS-REFERENCES TO RELATED APPLICATIONS

This application claims priority from Japanese Patent Application No. JP2004-167406, filed Jun. 4, 2004, the entire disclosure of which is incorporated herein by reference.

BACKGROUND OF THE INVENTION

The present invention relates to magnetic disk drives, optical disk drives and other information recording and reproducing apparatus and their application systems. In particular, the invention is applicable to an information recording and reproducing apparatus which employs batteries as its power source and is operated mainly to read out information.

Recently, high density recording technology has remarkably developed and advanced in magnetic disk drives, optical disk drives and the like. Information recording and reproducing apparatus now in practical use include those which can store more than several or several ten gigabytes with media of as small as 25 to 45 mm in diameter. Making use of the compactness and large capacity, these information recording and reproducing apparatus are widely used in portable application systems including portable computers, portable music players and portable video viewers. Many of these application systems depend on either alkaline manganese and other primary batteries or Ni—Cd, Ni—MH, Li-ion and other secondary batteries as their power sources. However, these batteries have not yet reached a satisfactory level in terms of capacity (continuously dischargeable electric energy) giving the electric energy required to satisfy the demand for longer continuous operating time periods. The most direct solution for reducing the power consumed by an information recording and reproducing apparatus and its application system is to lower the maximum power consumption of each functional block by making its energy consumption more efficient. To make the energy consumption more efficient, it is necessary to, for example, make each component smaller and lighter, miniaturize the circuit, lower the operating voltage and change the principle of operation. By these methods, however, it is difficult to immediately and remarkably reduce the power consumption.

Therefore, application systems of information recording and reproducing apparatus employ such a feature that if any access has not occurred to an information recording and reproducing apparatus over a relatively long time period or if no access is likely to occur for a relatively long time period, the information recording and reproducing apparatus is forced into a low power consumption mode such as a standby mode or sleep mode. Power consumption by an information recording and reproducing apparatus in such a low power consumption mode is suppressed to about tenth of that in an active mode such as an active idle mode or read/write mode. Therefore, as the low power consumption mode period increases with respect to the active mode period, the average power consumption by the information recording and reproducing apparatus and the total average power consumption by its application system can be reduced increasingly. If the total average power consumption by the application system is reduced, it is consequently possible to make the power supply section smaller and lighter or extend the continuous operation time per battery exchange or charge.

However, when the information recording and reproducing apparatus returns to an active mode (becomes active again) from a low power consumption mode, its total power consumption greatly exceeds that in the active mode since respective functional blocks simultaneously consume power to initialize them and start mechanisms. Although the aforementioned feature can reduce the average power consumption of the system, it has posed a problem in that an operational impact is given to the information recording and reproducing apparatus and its application system when the mode returns to an active mode from a low power consumption mode. That is, even when the power supply has a current supply capacity enough to sustain the active mode, the information recording and reproducing apparatus may increase the consumption current beyond the capacity when upon reactivation. In this case, due to the output impedance of the power supply, the input power supply voltage to the information recording and reproducing apparatus may greatly fall and make the system unreliable. For example, the system may stop, go out of control and improperly issue the reset signal. Also if the power supply uses a battery, it may be judged wrongly due to the instantaneous fall of the power supply voltage that the battery is exhausted despite the amount of discharge yet lower than prescribed. In this case, the system may be stopped without being reactivated. The direct method to solve these problems is to reduce the output impedance of the power supply by enlarging the output capacity of the power supply. However, enhancing the power supply output merely to solve the problem of current supply during reactivation is remarkably disadvantageous in terms of system cost. In the case of a portable apparatus which mainly uses a battery as the power source, it is necessary to use a larger battery, which not only raises the system cost but also deteriorates the portability due to the enlarged size and increased weight of the system. Therefore, this method has not become an effective solution. In addition, when the battery is rapidly discharged to activate or reactivate the information recording and reproducing apparatus, the battery instantaneously generates heat within the battery cells due to the internal resistance. This deteriorates the energy retrieval efficiency and may degrade the cyclability of the battery, which is disadvantageous in terms of system maintenance cost.

Techniques have been disclosed as solutions for these problems. A first prior technique is disclosed in Japanese Patent Laid-open No. 2003-189676 "DISK DRIVE AND SPINDLE MOTOR CONTROL CIRCUIT". According to the disclosure, a capacitor is charged by a counter electromotive force which occurs in the motor when the motor is stopped. When the motor is next started, the energy accumulated in the capacitor is supplied to the rotation speed control circuit in order to reduce the power supply current. A second prior technique is disclosed in Japanese Patent Laid-open No. 6-119708 "OPTICAL DISK DRIVE AND ITS APPLICATION DEVICE". According to the disclosure, the current supplied to the spindle motor is limited when the power consumption increases to peaks, namely when the spindle motor is restarted and when the rotation speed is changed from a steady speed. A third prior technique is disclosed in Japanese Patent Laid-open No. 2003-173638 "DISK STORAGE DEVICE AND MOTOR CONTROLLING METHOD". According to the disclosure, if it is detected by the CPU via the current sensor that the current spent by the spindle motor of the disk storage device is larger than a predefined value when the spindle motor is started, the current supplied to the voice coil motor is limited by the CPU to within a predefined maximum value in order to reduce the current supplied to start the disk storage device. A fourth prior technique is disclosed in Japanese Patent Laid-open No. 2000-323219 "DISK STORAGE DEVICE AND SPINDLE START CONTROL METHOD USING FOR THE SAME, AND RECORDING MEDIUM ON WHICH THE CONTROL PROGRAM IS RECORDED". According to the disclosure, the microprocessor always monitors the current consumed by drives in the disk array. If the consumed current is detected increasing beyond a threshold while a spindle is being started, starting the spindle is temporally canceled so that the current consumed by the physical disks is controlled to within the threshold. A fifth prior technique is disclosed in Japanese Patent Laid-open No. 1998-69702 "VOLTAGE ABNORMALITY DETECTING CIRCUIT OF MAGNETIC DISK DRIVE". According to the disclosure, a voltage abnormality detecting circuit compares threshold voltage Vth with power supply voltage Vcc supplied to the magnetic disk drive. If the power supply voltage Vcc is below the threshold voltage Vth, the voltage abnormality detecting circuit outputs an abnormality signal to the main control unit in order to prevent the device from destructing data and malfunctioning. A sixth prior technique is disclosed in Japanese Patent Laid-open No. 2003-242673 "OPTICAL DISK RECORDING AND REPRODUCING APPARATUS AND METHOD". According to the disclosure, there is provided means for monitoring the power supply voltage to the recording circuit. If the voltage is below a preset value during recording, the recording is halted or done intermittently. Continuous recording is not done until the voltage recovers in order to prevent wrong data recording.

BRIEF SUMMARY OF THE INVENTION

In the case of the first prior technique cited above, however, a large capacitor must be used to accumulate enough energy to help start or restart the spindle. Due to the cost and physical dimensions, such a component poses problems in that the manufacture cost of the information recording and reproducing apparatus increases and that the size of the information recording and reproducing apparatus is enlarged. A secondary battery may be used as a substitute for the capacitor. However, a secondary battery used as a substitute for the condenser cannot be a practical solution since it not only complicates the charging circuit and necessitates periodic maintenance but also is inconsistent with the original goal of reducing the capacity of the power supply. In addition, either energy accumulation means is effective only when the spindle is started or restarted. At any other timings, it is not effective in reducing the consumed current.

In the case of the second through fourth techniques cited above, the current to drive a specific functional block in the information recording and reproducing apparatus is limited or functional blocks are exclusively operated so as to limit the total consumption current of the information recording and reproducing apparatus. Surely, as expected, these prior techniques can lower the peak consumption current of the information recording and reproducing apparatus and therefore reduce the output capacity required of the power supply. However, these prior techniques give no consideration to the total consumption current, or the state of the power supply, of the information recording and reproducing apparatus or its application system. Since the current to drive each functional block is limited by open loop control, effective control cannot be provided. That is, limitation of a drive current is sometimes insufficient when the total consumption of the application system is so large that the power supply voltage falls below an expected level to make the system unreliable. In addition, if the power supply uses such a power source as a battery, dependence of the power supply voltage upon the consumption current cannot be grasped correctly since the output characteristic greatly change depending on its temperature, discharge current and other operating conditions, remaining capacity, cell deterioration, etc. This makes effective control virtually impossible. That is, such a power source as a battery which is uncertain in characteristics makes it more likely that the power supply voltage to the information recording and reproducing apparatus may fall below the lowest level required for normal operation due to the consumption current which momentarily increases during activation, reactivation or the like although the information recording and reproducing apparatus can be operated normally yet in active modes. If such a situation occurs, the application system cannot continue operating normally. This makes it virtually impossible to fully use the potential capacity of the battery to operate the application system, resulting effectively in a shortened operation life of the battery. In addition, if a Ni—Cd or Ni—MH battery is used, repeating imperfect discharge/charge causes what is called a memory effect, which gradually decreases the effective capacity of the battery. These problems can be avoided only by minimizing the maximum consumption current of each functional block so as to allow a sufficiently large safety factor. The problem with this means is that the consumption current of the information recording and reproducing apparatus is sometimes excessively limited. This makes the operation, activation or reactivation slower than required, resulting in deteriorating the information recording and reproducing apparatus and its application system in performance.

In the case of the fourth prior technique, starting the spindle of physical disks is cancelled as necessary by the microprocessor by issuing a command which goes through the storage bus. Therefore, since issuing, delivering and interpreting the command causes a delay, the consumption current sometimes cannot be limited in time, resulting in deteriorating the operational stability of the system.

In the case of the fifth and sixth prior techniques cited above, recording operation is halted to prevent data destruction if the power supply voltage falls below a predefined value. Although the consumption current of the information recording and reproducing apparatus is temporally reduced by halting recording operation, no effective action is taken when the information recording and reproducing apparatus is started or restarted, that is, when the consumption current particularly increases. Thus, this technique substantially does not reduce the peak consumption current. In addition, since these prior techniques do not start taking action to reduce the consumption current after the power supply voltage to the information recording and reproducing apparatus falls, the initial fall of the power supply voltage may deteriorate the reliable operation of the total application system.

It is a feature of the present invention to provide an information recording and reproducing apparatus capable of operating reliably even when a large current must be consumed for reactivation or the like without increasing the output capacity of the power supply.

The information recording and reproducing apparatus according to embodiments of the present invention monitors the power supply voltage before stabilized and, if the voltage falls to a predetermined reference voltage, performs control so as to suppress the consumption current of each section in the information recording and reproducing apparatus.

According to the present invention, it is possible to average the current consumed of an information recording and reproducing apparatus by lowering the peak consumption current. This makes it possible to lower the output current capacity required of the power supply. Thus, the power supply can be reduced in size while the system can be improved in reliability and substantially in performance.

DETAILED DESCRIPTION OF THE INVENTION

Specific embodiments of the present invention will be described below in detail by using the drawings. Note that although magnetic disk drives are shown as examples of information recording and reproducing apparatus in the following description of the embodiments, this does not mean the present invention is applicable only to magnetic disk drives. The present invention is also applicable to other information recording and reproducing apparatus including optical disk drives and magnetic tape drives.

Figure 1:
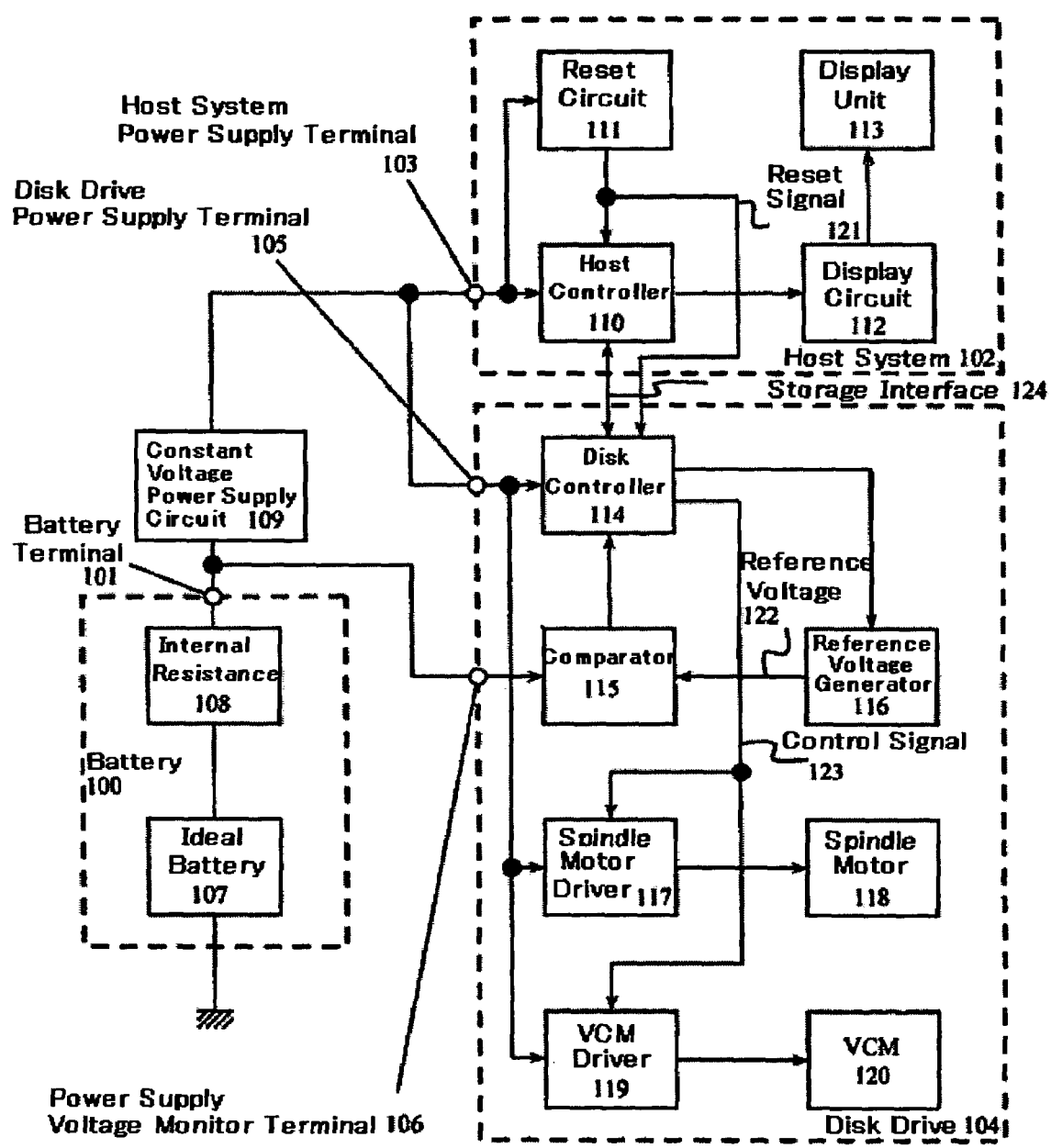
FIG. 1 is provided to explain an information recording and reproducing apparatus according to a first embodiment of the present invention.

FIG. 1 is provided to describe an information recording and reproducing apparatus and its application system according to a first embodiment of the present invention. This application system comprises: a battery 100 as a power source; a host system 102 which implements major functions of the application system; and a magnetic disk drive 104 which retains the data needed by the host system 102.

As known widely, the terminal voltage of a practical battery with no load (open-circuit voltage) is almost constant regardless of the remaining energy (=total energy capacity−discharged energy). However, as the discharged energy increases (the remaining energy decreases), the internal resistance increases and the drop of the terminal voltage from the open-circuit voltage gradually increases even if the load current is kept constant. An ideal battery 107 and an internal resistance 108, depicted in the battery 100 of FIG. 1, are an equivalent circuit which schematically represents this characteristic. The ideal battery 107 is a virtual electromotive force which has no internal resistance and provides a constant electromotive force determined by the material of the battery cells. The internal resistance 108 exists in the battery as a resistor connected in series with the ideal battery 107 and increases as the energy discharged from the ideal battery 107 increases. The same characteristic and equivalent circuit of a practical battery also apply to the following description. The output of the battery 100 is regulated by a constant voltage power supply circuit 109 to a predefined voltage which is lower than the battery's terminal voltage and needed by each section of the application system. This regulation absorbs the voltage fluctuation which occurs at the battery terminal 101 due to the progress of discharge from the battery 109, the change of the load current and the like. The regulated voltage is supplied to the host system 102 and the disk drive 104 respectively via the host system power supply terminal 103 and the disk drive power supply terminal 105.

The host system 102 contains a host controller 110, which totally controls the function of the application system. The application system in this embodiment is assumed to be a video viewer where motion image compressed data stored in the disk drive 104 is read out to the host controller 110, expanded therein and output to a display unit 113 via a display circuit 112. The host system 102 has a built-in reset circuit 111. The reset circuit 111 monitors the power supply voltage in the host system 102, namely, the output of the constant voltage power supply circuit 109. If the power supply voltage exceeds a predetermined voltage above which the host system can operate reliably, the reset circuit 111 immediately generates a reset signal 121. Upon generation of this reset signal 121, the individual functional blocks of the application system and the disk drive 104 are initialized, allowing the total application system to operate reliably.

If motion image compressed data becomes necessary to create and display motion images, the host controller 110 issues a read command to a disk controller 114 in the disk drive 104 via a storage interface 124. Receiving the read command from the host controller 110, the disk controller 114 uses a control signal 123 to control a spindle motor driver 117 and a VCM (Voice Coil Motor) driver 119. The spindle motor driver 117 is controlled so as to retain the spindle motor 118 at a proper rotation speed while the VCM driver 119 is controlled so as to properly orient the voice coil motor 120. By these actions, the read/write head in the disk drive 104 is located to an appropriate position on a recording medium to read motion image compressed data from the recording medium. The read motion image compressed data is given necessary processing, such as error detection and correction, by the disk controller 114 and conveyed to the host controller 110 again via the storage interface 124.

In addition to the above-described operations as a motion image viewer, the host controller 110 issues a voltage setting command to the disk controller 114 in advance. The setting command specifies a battery lower limit voltage at which the disk drive 104 is to start limiting its consumption current. Based on the value specified in the command, the disk controller 114 sets the battery lower limit voltage to the reference voltage generator 116. This battery lower limit voltage is higher than the voltage calculated by adding the voltage drop caused by the constant voltage power supply circuit 109 to the lowest power supply voltage above which the host system 102 and the disk drive 104 can operate normally. That is, the voltage set by the command is made higher than the input voltage of the constant voltage power supply circuit 109 at which its output voltage begins to fall below the lowest power supply voltage. Thus, if the total consumption current of the application system increases to lower the voltage of the battery terminal 101, the consumption current of the disk drive 104 is limited before the operation of the application system becomes unreliable. Consequently, the output voltage of the constant voltage power supply 109 is retained, allowing the total application system to operate reliably. In addition, when the consumption current is limited, the host controller 110 separately issues an operation time out extension command to the disk controller 114 in order to prevent time out errors which would otherwise occur since the time periods spent to initialize and operate mechanisms such as the spindle motor 118 and VCM 120 in the disk drive 104 are elongated due to the limited consumption current.

The voltage of the battery terminal 101, before regulated by the constant voltage power supply circuit 109, is conveyed into the disk drive 104 via a power supply voltage monitor terminal 106 and is compared with the reference voltage 122 by a comparator 115. The power supply voltage monitor terminal 106 may be implemented as a dedicated input terminal, input connector or the like on a circuit board in the disk drive 104. If the disk drive has a 50-pin connector which is compliant with the ATA/ATAPI-5 (ANSI NCITS 340-2000 AT Attachment with Packet Interface-5) specification established by the ANSI (American National Standard for Information Technology), it is possible to use pins A through D which can be defined and used arbitrarily by the user. A description of how to implement the power supply voltage monitor terminal 106 is common to the embodiments and therefore omitted below.

The comparison result is reported to the disk controller 114. Based on this comparison result, the disk controller 114 generates the control signal 123 by which the spindle motor driver 117 and the VCM driver 119 are respectively instructed on the current to drive the spindle motor 118 and the current to drive the VCM 120 so as not to let the voltage of the battery terminal 101 fall below the previously set lower limit voltage. That is, if the battery lower limit voltage set by the aforementioned command is lower than the voltage at the power supply voltage monitor terminal 106 and battery terminal 101, the disk controller 114 does not give special instructions to the spindle motor driver 117 and the VCM driver 119 respectively on the limitation of the drive currents. However, if the current consumed by the host system 102 or the disk drive 104 increases due to reactivation or some other reason or the internal resistance 108 of the battery 100 increases due to the progress of discharge from the battery 100 or some other reason, the voltage of the battery terminal 101 may consequently fall to the battery lower limit voltage set by the aforementioned command. In this case, the disk controller 114 uses the control signal 123 to successively instruct the spindle motor driver 117 or the VCM driver 119 to reduce the drive current until the voltage of the battery terminal 101 rises above the battery lower limit voltage.

Only one of the spindle motor 118 and the VCM 120 may be instructed to limit the drive current. If further drive current limitation is needed, both the spindle motor 118 and VCM 120 may be instructed to limit the drive currents. In the case of pulse amplitude modulation, the drive current can be limited by limiting the maximum amplitude of the drive current pulses. In the case of pulse width modulation, the drive current can be limited by limiting the maximum pulse width (phase angle) of the drive current pulses. They can be used as drive current limitation methods although other methods are also available as the case may be. Further, it is also possible to reduce the current consumed by another functional block unless the disk drive functionally deteriorates.

Since the above-mentioned actions reduce the consumption current of the disk drive 104 and therefore the consumption current of the total application system, the voltage drop caused by the internal resistance 108 of the battery 100 decreases to raise the voltage of the battery terminal 101. Thus, the power supply voltage at the host system power supply terminal 103 and disk drive power supply terminal 105 is retained to allow the total application system to operate reliably. More preferably, the embodiment may be configured in such a manner that the host controller 110 is informed by the disk controller 114 how and whether the internal consumption current of the disk drive is being limited and uses the information to trigger the action of reducing the consumption current of the host system 102 if necessary. For this purpose, it is preferable for the disk controller 114 to be provided with a command which allows the host controller 110 to read out information as to how and whether the consumption current is being limited.

Figure 2:
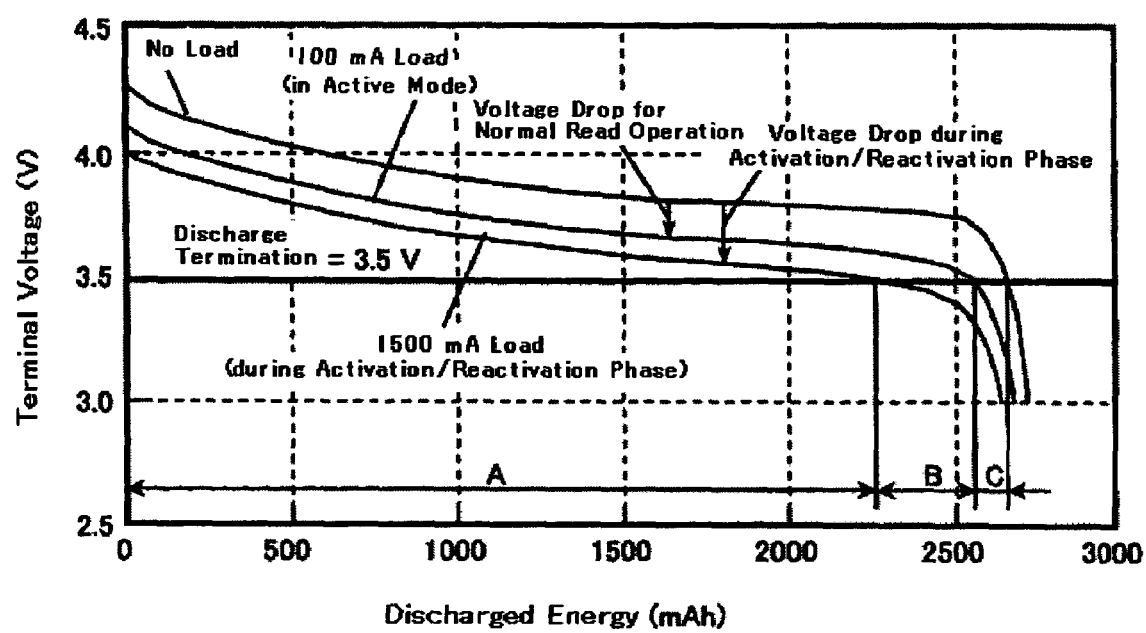
FIG. 2 is provided to explain the operation and advantage of the information recording and reproducing apparatus described with FIG. 1.

FIG. 2 is provided to explain the operation and advantage of the information recording and reproducing apparatus and its application system of the present embodiment described with reference to FIG. 1. The graph in the figure shows relations between the energy discharged from each cell constituting the battery 100 and its terminal voltage.

The cells are Li-ion secondary cells with a nominal electromotive force of 3.7 V and a nominal capacity of 2700 mAh per cell. When the cells are fully charged, the terminal voltage is about 4.3 V, 4.1 V and 4.0 V respectively with no load, 1000 mA and 1500 mA in terms of discharge current (load current) per cell. The discharge current of 1000 mA means that the disk drive 104 is an active mode and the host system 102 is operating normally (normal read). Discharge current 1500 mA means that the disk drive 104 is entering the active mode from a low power consumption mode and the host system 102 is operating normally (reactivation from the low power consumption mode). The cell discharge stop voltage, that is, the lowest allowable level of the voltage of the battery terminal 101, is set to 3.5 V per cell. If the battery terminal voltage per cell falls below this discharge stop voltage 3.5 V, the power supply voltage at the host system power supply terminal 103 and disk drive power supply terminal 105 begins to drop, making the operation of the application system of FIG. 1 unreliable.

Under these conditions, until the discharged energy reaches 2250 mAh after the cells are fully charged (period A in FIG. 2), the battery terminal 101 voltage does not fall below the preset lower limit 3.5 V even when the application system is performing either normal read operation or reactivation (returning the disk drive into the active mode from the low power consumption mode in order to resume read operation). Therefore, the application system is not critically influenced by reactivation in this period. However, after the discharged energy exceeds 2250 mAh (period B in FIG. 2), the terminal voltage falls below 3.5 V during reactivation from the low power consumption mode unless some limitation is put on the consumption current. Thus, once the disk drive 104 enters the low power consumption mode, the application system has no choice but to stop its total operation since it is not possible to reactivate the disk drive 104. Therefore, the discharged energy does stop at 2250 mAh in the worst case.

In the case of the present embodiment as described with FIG. 1, the consumption current when the disk drive 104 is reactivated is continuously limited just enough so as to prevent the voltage at the power supply voltage monitor terminal 106 from falling below 3.5 V. This allows reactivation as well as successive read operations until the discharged energy reaches 2550 mAh at best. Therefore, under these conditions, the information recording and reproducing apparatus and its application system according to the present embodiment can extend the operation life of the cells constituting the battery 100 by a maximum of about 13%; from 2250 mAh to 2550 mAh. Further, if the embodiment is configured such that the host system 102 senses the limitation of the consumption current in the disk drive 104 and limits the current consumed by some functional blocks in the host system 102 (for example, limiting the display brightness, backlight illumination and audio output amplification in the display unit 113) as mentioned earlier, the period in which reactivation as well as successive operations are allowed in the total application system can be extended to a maximum of some 2700 mAh (period C in FIG. 2). However, note that these periods are determined by the magnitude of the minimum consumption current required to run the disk drive 104 and the host system 102.

Figure 3:
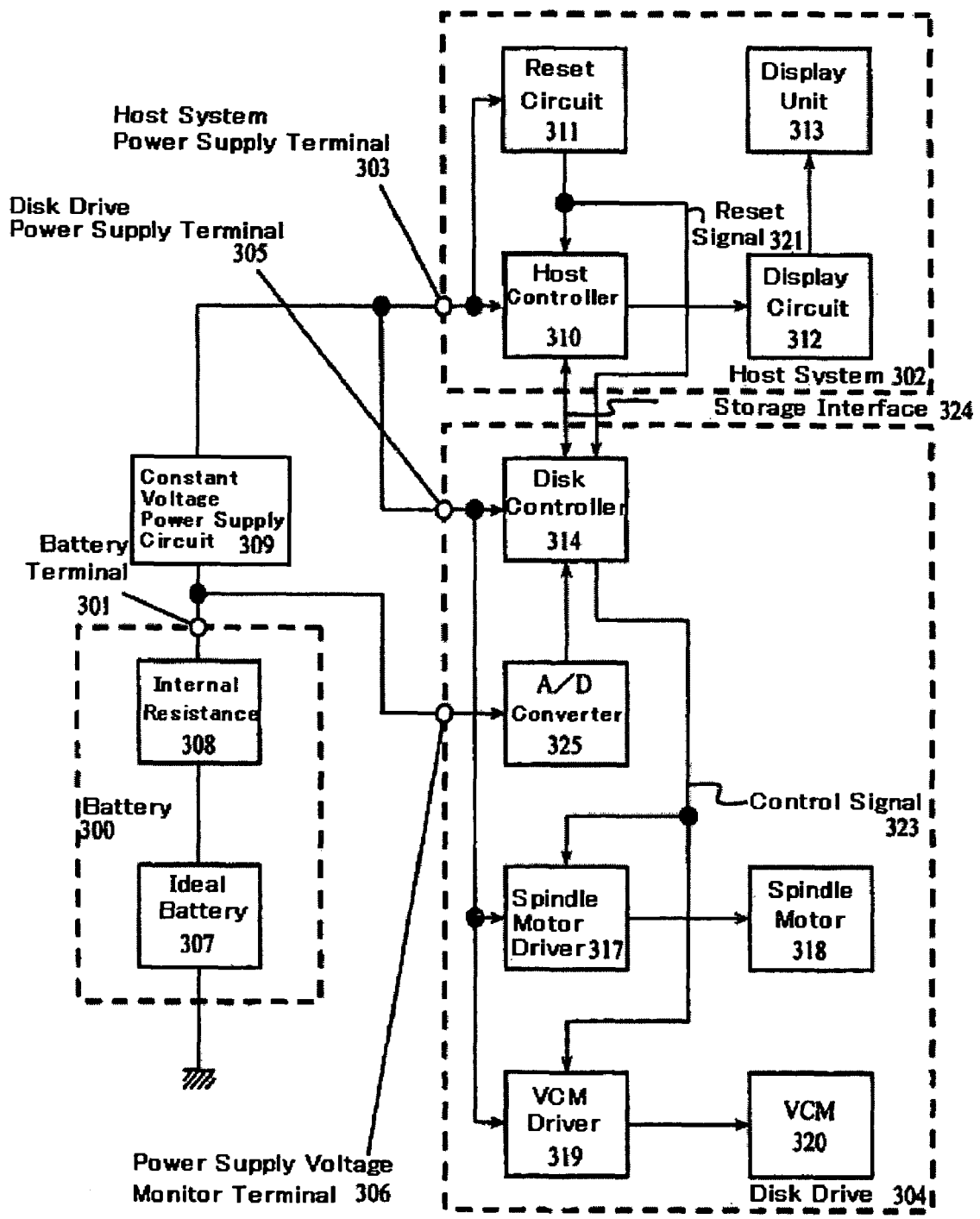
FIG. 3 is provided to explain an information recording and reproducing apparatus according to a second embodiment of the present invention.

FIG. 3 is provided to describe an information recording and reproducing apparatus and its application system according to a second embodiment of the present invention. This application system comprises: a battery 300 as a power source; a host system 302 which implements major functions of the application system; and a magnetic disk drive 304 which retains the data needed by the host system 302.

The output of the battery 300 is regulated by a constant voltage power supply circuit 309 to a predefined voltage which is lower than the battery's terminal voltage and needed by each section of the application system. This regulation absorbs the voltage fluctuation which occurs at the battery terminal 301 due to the progress of discharge from the battery 309, the change of the load current and the like. The regulated voltage is supplied to the host system 302 and the disk drive 304 respectively via the host system power supply terminal 303 and the disk drive power supply terminal 305. The host system 302 contains a host controller 310 which functionally controls the total application system. The application system in this embodiment is also assumed to be a video viewer where motion image compressed data stored in the disk drive 304 is read out to the host controller 310, expanded therein and output to a display unit 313 via a display circuit 312.

The host system 302 has a built-in reset circuit 311. The reset circuit 311 monitors the power supply voltage in the host system 302, namely, the output of the constant voltage power supply circuit 309. If the power supply voltage exceeds a predetermined voltage above which the host system can operate reliably, the reset circuit 311 immediately generates a reset signal 321. Upon generation of this reset signal 321, the individual functional blocks of the application and the disk drive 104 are initialized, allowing the total application system to operate reliably as mentioned earlier. The same holds for the following description.

If motion image compressed data becomes necessary to create and display motion images, the host controller 310 issues a read command to a disk controller 114 in the disk drive 304 via a storage interface 324. Receiving the read command from the host controller 310, the disk controller 314 uses a control signal 323 to control a spindle motor driver 317 and a VCM driver 319. The spindle motor driver 317 is controlled so as to retain the spindle motor 318 at a proper rotation speed while the VCM driver 319 is controlled so as to properly orient the voice coil motor 320. By these actions, the read/write head in the disk drive 304 is located to an appropriate position on a recording medium to read motion image compressed data from the recording medium. The read motion image compressed data is given necessary processing, such as error detection and correction, by the disk controller 314 and conveyed to the host controller 310 again via the storage interface 324.

In addition to the above-described operations as a motion image viewer, the host controller 310 issues a voltage setting command to the disk controller 314 in advance. The setting command specifies a battery lower limit voltage at which the disk drive 304 is to start limiting its consumption current. This battery lower limit voltage is higher than the voltage calculated by adding the voltage drop caused by the constant voltage power supply circuit 309 to the lowest power supply voltage above which the host system 102 and the disk drive 304 can operate normally. Thus, if the total consumption current of the application system increases to lower the voltage of the battery terminal 301, the consumption current of the disk drive 304 is limited before the operation of the application system becomes unreliable. Consequently, the output voltage of the constant voltage power supply 309 is retained, allowing the total application system to operate reliably. In addition, when the consumption current is limited, the host controller 310 separately issues an operation time out extension command to the disk controller 314 in order to prevent time out errors which would otherwise occur since the time periods spent to initialize and operate mechanisms such as the spindle motor 318 and VCM 320 in the disk drive 304 are elongated due to the limited consumption current.

The voltage of the battery terminal 301, before regulated by the constant voltage power supply circuit 309, is conveyed into the disk drive 304 via a power supply voltage monitor terminal 306, converted to digital data by an A/D converter 325 and reported to the disk controller 314. Based on the result of comparing this conversion result with the battery lower limit voltage previously set by the command, the disk controller 314 generates the control signal 323 by which the spindle motor driver 317 and the VCM driver 319 are respectively instructed on the current to drive the spindle motor 318 and the current to drive the VCM 320 so as not to let the voltage of the battery terminal 301 fall below the previously set lower limit voltage.

That is, if the battery lower limit voltage set by the aforementioned command is lower than the voltage at the power supply voltage monitor terminal 306 and battery terminal 301, the disk controller 314 does not give special instructions to the spindle motor driver 317 and the VCM driver 319 respectively on the limitation of the drive currents. However, if the current consumed by the host system 302 or the disk drive 304 increases due to reactivation or some other reason or the internal resistance 308 of the battery 300 increases due to the progress of discharge from the battery 300 or some other reason, the voltage of the battery terminal 301 may consequently fall to the battery lower limit voltage set by the aforementioned command. In this case, the disk controller 314 uses the control signal 323 to instruct the spindle motor driver 317 or the VCM driver 319 to increasingly reduce the drive current until the voltage of the battery terminal 301 rises to or above the battery lower limit voltage. Only one of the spindle motor 318 and the VCM 320 may be instructed to limit the drive current. If further drive current limitation is needed, both the spindle motor 318 and VCM 320 may be instructed to limit the drive currents. Further, it is also possible to reduce the current consumed by another functional block unless the disk drive functionally deteriorates.

Since the above-mentioned actions reduce the consumption current of the disk drive 304 and therefore the consumption current of the total application system, the voltage drop caused by the internal resistance 308 of the battery 300 decreases to raise the battery terminal 301 voltage. Thus, the power supply voltage at the host system power supply terminal 303 and disk drive power supply terminal 305 is retained to allow the total application system to operate reliably. More preferably, the embodiment may be configured such that the host controller 310 is informed by the disk controller 314 how and whether the internal consumption current of the disk drive is being limited and uses the information to trigger the action of reducing the consumption current of the host system 302 if necessary. For this purpose, it is preferable for the disk controller 314 to support a command which allows the host controller 310 to read out information as to how and whether the consumption current is being limited.

Figure 4:
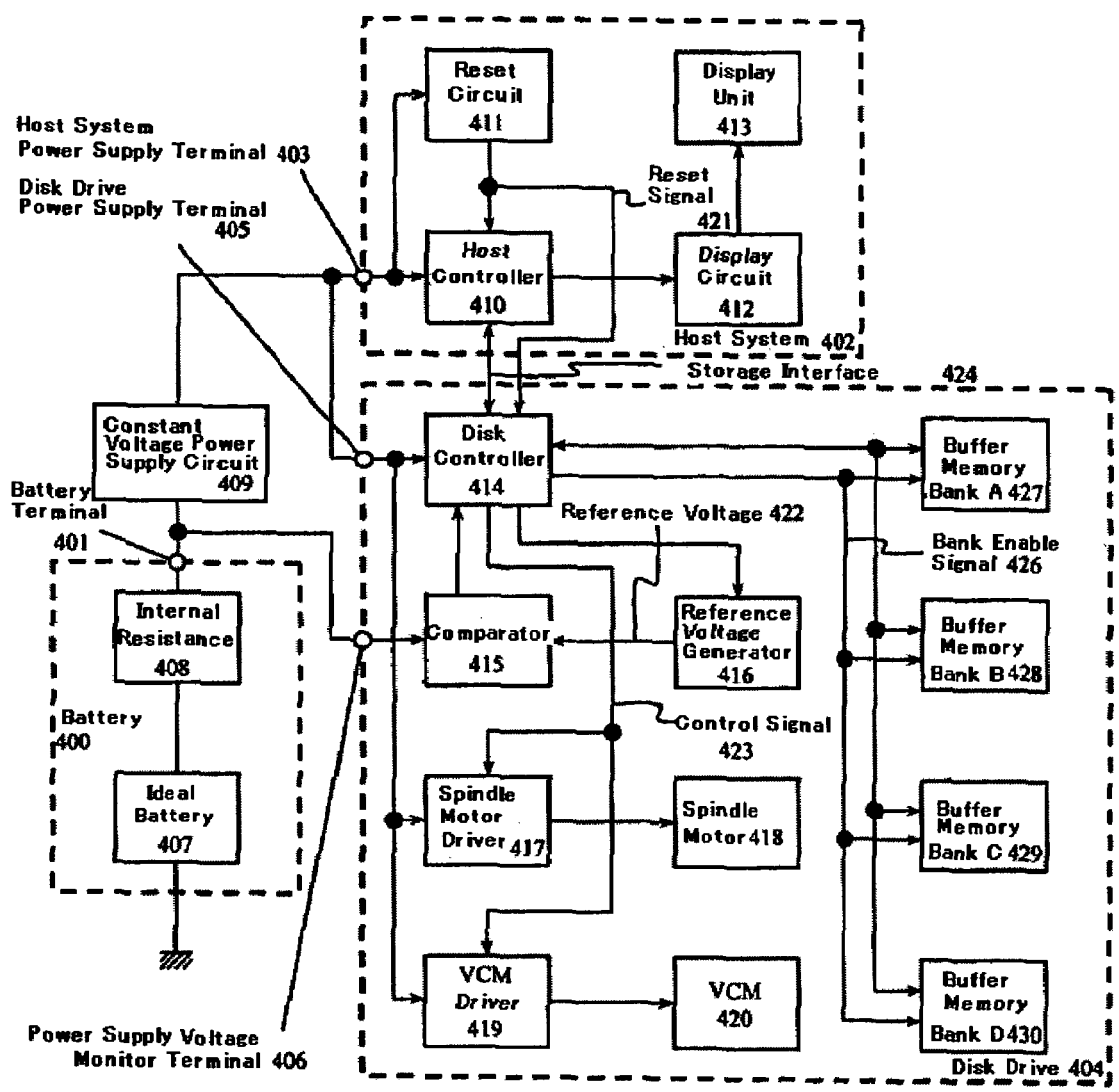
FIG. 4 is provided to explain an information recording and reproducing apparatus according to a third embodiment of the present invention.

FIG. 4 is provided to describe an information recording and reproducing apparatus and its application system according to a third embodiment of the present invention. This application system comprises: a battery 400 as a power source; a host system 402 which implements major functions of the application system; and a magnetic disk drive 404 which retains the data needed by the host system 402.

The output of the battery 400 is regulated by a constant voltage power supply circuit 409 to a predefined voltage which is lower than the battery's terminal voltage and needed by each section of the application system. This regulation absorbs the voltage fluctuation which occurs at the battery terminal 401 due to the progress of discharge from the battery 409, the change of the load current and the like. The regulated voltage is supplied to the host system 402 and the disk drive 404 respectively via the host system power supply terminal 403 and the disk drive power supply terminal 405. The host system 402 includes a host controller 410 which functionally controls the total application system. The application system in this embodiment is also assumed to be a video viewer where motion image compressed data stored in the disk drive 404 is read out to the host controller 410, expanded therein and output to a display unit 413 via a display circuit 412. The host system 402 has a built-in reset circuit 411. The reset circuit 411 monitors the power supply voltage in the host system 402, namely, the output of the constant voltage power supply circuit 409. If the power supply voltage exceeds a predetermined voltage above which the host system can operate reliably, the reset circuit 411 immediately generates a reset signal 421.

If motion image compressed data becomes necessary to create and display motion images, the host controller 410 issues a read command to a disk controller 414 in the disk drive 404 via a storage interface 424. Receiving the read command from the host controller 410, the disk controller 414 uses a control signal 423 to control a spindle motor driver 417 and a VCM driver 419. The spindle motor driver 417 is controlled so as to retain the spindle motor 418 at a proper rotation speed while the VCM driver 419 is controlled so as to properly orient the voice coil motor 420. By these actions, the read/write head in the disk drive 404 is located to an appropriate position on a recording medium to read motion image compressed data from the recording medium.

The read motion image compressed data is given necessary processing, such as error detection and correction, by the disk controller 414 and conveyed to the host controller 410 again via the storage interface 424. Buffer memories 427 through 430 connected with the disk controller 414 is used to store the results of processing the retrieved data, such as error detection and correction results, and the data cached from the recording medium. The buffer memories 427 through 430 may also be used as temporary storages to receive data from the host controller 410 for write onto the recording medium.

In addition to the above-described operations as a motion image viewer, the host controller 410 issues a voltage setting command to the disk controller 414 in advance. The setting command specifies a battery lower limit voltage at which the disk drive 404 is to start limiting its consumption current. Based on the value specified in the command, the disk controller 414 sets the battery lower limit voltage to the reference voltage generator 416. The voltage of the battery terminal 401, before regulated by the constant voltage power supply circuit 409, is conveyed into the disk drive 404 via a power supply voltage monitor terminal 406 and compared with the reference voltage 422 by a comparator 415. The result is reported to the disk controller 414. Based on this result, the disk controller 414 generates the control signal 423 by which a bank enable signal 426 instructs the respective buffer memory banks 427 through 430 on their operation modes.

That is, if the battery lower limit voltage set by the aforementioned command is lower than the voltage at the power supply voltage monitor terminal 406 and battery terminal 401, the disk controller 414 does not give special instruction to the buffer memory 427 through 430 on the operation mode. However, if the current consumed by the host system 302 or the disk drive 404 increases due to reactivation or some other reason or the internal resistance 408 of the battery 400 increases due to the progress of discharge from the battery 400 or some other reason, the battery terminal 401 voltage may consequently fall to the battery lower limit voltage set by the aforementioned command. In this case, the disk controller 414 uses the bank enable signal 426 to instruct some banks of the buffer memories 427 through 430 to disable them or enter the low power data retention mode so as to increasingly reduce the consumption current until the voltage of the battery terminal 401 rises above the battery lower limit voltage. To reduce the consumption current, the current to drive the spindle motor 418 and/or the current to drive the VCM 420 may be limited as described with FIG. 1 in addition to the buffer memories 427 through 430. Further, it is also possible to reduce the current consumed by another functional block unless the disk drive functionally deteriorates.

Since the above-mentioned actions reduce the consumption current of the disk drive 404 and therefore the consumption current of the total application system, the voltage drop caused by the internal resistance 408 of the battery 400 decreases to raise the voltage of the battery terminal 401. Thus, the power supply voltage at the host system power supply terminal 403 and disk drive power supply terminal 405 is retained to allow the total application system to operate reliably. Note that although the buffer memories 427 through 430 are four banks A through D in this embodiment, the number of banks does not have to be four. Increasing the banks allows the performance of the disk drive 404 to be adjusted more effectively since the consumption current can be adjusted in smaller steps. However, significantly increasing the number of banks is not appropriate since bank management is complicated and more bus transceivers are needed to receive data storage addresses and receive/send data.

Figure 5:
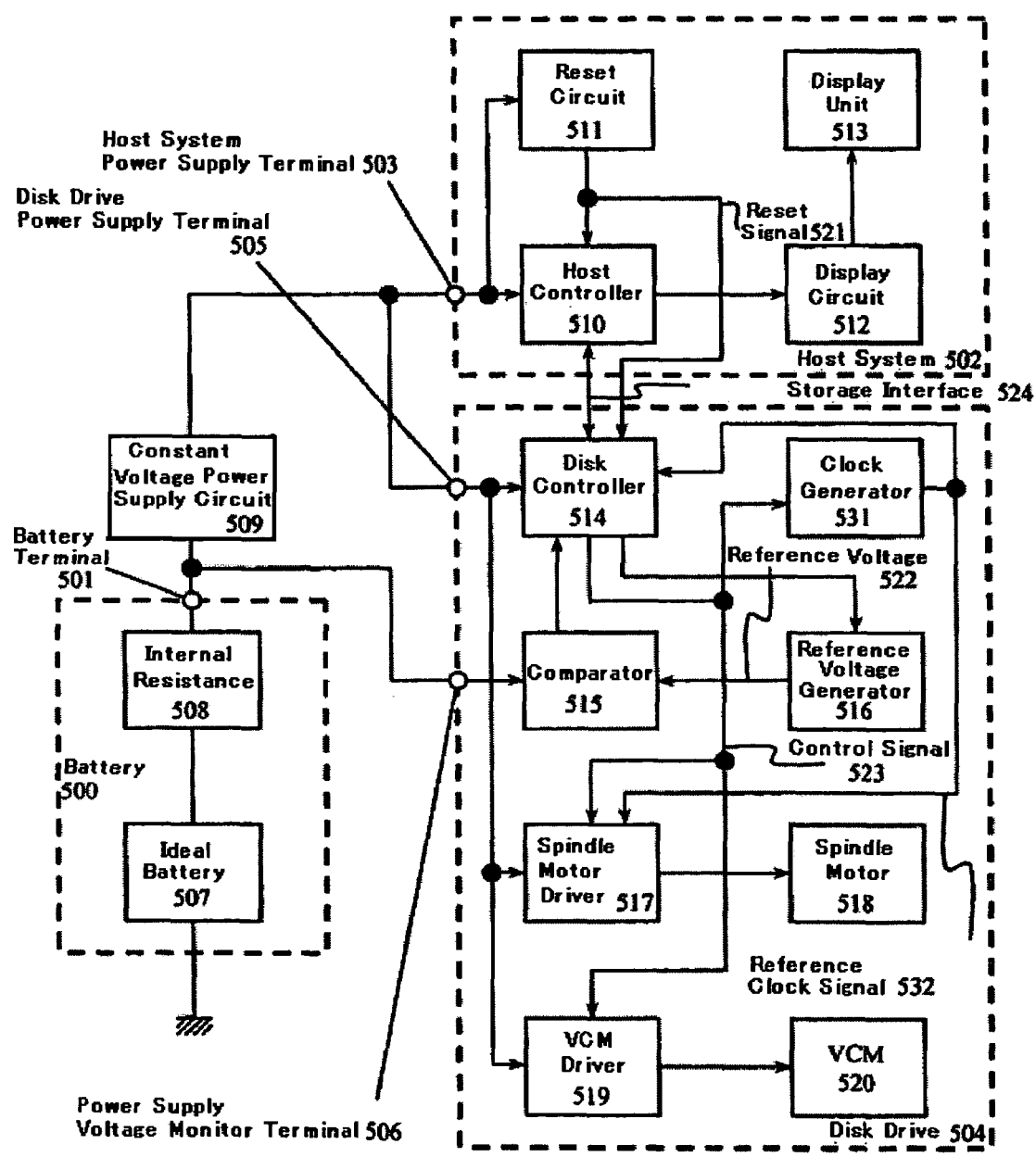
FIG. 5 is provided to explain an information recording and reproducing apparatus according to a fourth embodiment of the present invention.

FIG. 5 is provided to describe an information recording and reproducing apparatus and its application system according to a fourth embodiment of the present invention. This application system comprises: a battery 500, a power source; a host system 502 which implements major functions of the application system; and a magnetic disk drive 504 which retains the data needed by the host system 502.

The output of the battery 500 is regulated by a constant voltage power supply circuit 509 to a predefined voltage which is lower than the battery's terminal voltage and needed by each section of the application system. This regulation absorbs the voltage fluctuation which occurs at the battery terminal 501 due to the progress of discharge from the battery 509, the change of the load current and the like. The regulated voltage is supplied to the host system 502 and the disk drive 504 respectively via the host system power supply terminal 503 and the disk drive power supply terminal 505. The host system 502 includes a host controller 510 which functionally controls the total application system. The application system in this embodiment is also assumed to be a video viewer where motion image compressed data stored in the disk drive 504 is read out to the host controller 510, expanded therein and output to a display unit 513 via a display circuit 512.

The host system 502 has a built-in reset circuit 511. The reset circuit 511 monitors the power supply voltage in the host system 502, namely, the output of the constant voltage power supply circuit 509. If the power supply voltage exceeds a predetermined voltage above which the host system can operate reliably, the reset circuit 511 immediately generates a reset signal 521. If motion image compressed data becomes necessary to create and display motion images, the host controller 510 issues a read command to a disk controller 514 in the disk drive 504 via a storage interface 524. Receiving the read command from the host controller 510, the disk controller 514 uses a control signal 523 to control a spindle motor driver 517 and a VCM driver 519. The spindle motor driver 517 is controlled so as to retain the spindle motor 518 at a proper rotation speed while the VCM driver 519 is controlled so as to properly orient the voice coil motor 520. By these actions, the read/write head in the disk drive 504 is located to an appropriate position on a recording medium to read motion image compressed data from the recording medium. The retrieved motion image compressed data is given necessary processing, such as error detection and correction, by the disk controller 514 and conveyed to the host controller 510 again via the storage interface 524.

In addition to the above-described operations as a motion image viewer, the host controller 510 issues a voltage setting command to the disk controller 514 in advance. The setting command specifies a battery lower limit voltage at which the disk drive 504 is to start limiting its consumption current. Based on the value specified in the command, the disk controller 514 sets the battery lower limit voltage to the reference voltage generator 516. The voltage of the battery terminal 501, before regulated by the constant voltage power supply circuit 509, is conveyed into the disk drive 504 via a power supply voltage monitor terminal 506 and compared with the reference voltage 522 by a comparator 515. The result is reported to the disk controller 514. Based on this result, the disk controller 514 generates the control signal 523 by which a clock generator 531 controls the frequency of a reference clock signal 532 so as not to let the battery terminal 501 voltage fall below the previously set lower limit voltage.

That is, if the battery lower limit voltage set by the aforementioned command is lower than the voltage at the power supply voltage monitor terminal 506 and battery terminal 501, the disk controller 514 does not give special instruction to the clock generator 531 on its oscillation frequency. However, if the current consumed by the host system 502 or the disk drive 504 increases due to reactivation or some other reason or the internal resistance 508 of the battery 500 increases due to the progress of discharge from the battery 500 or some other reason, the voltage of the battery terminal 501 may consequently fall to the battery lower limit voltage set by the aforementioned command. In this case, the disk controller 514 uses the control signal 523 to instruct the clock generator 531 to lower its oscillation frequency.

The reference clock signal 532 determines the operation speeds of functional blocks and the timings of signal exchanges between them in the disk drive 504. Now, integrated circuits by CMOS process are widely used. One of their characteristics is that the average consumption current is proportional to the operating clock frequency. Thus, the current consumed by the disk controller 514 can be reduced by lowering the frequency of the reference clock signal 532 supplied to the disk controller. The reference clock signal is also supplied to the spindle motor driver 517. The rotation speed of the recording medium in the disk drive 504 is determined based on its frequency. Thus, lowering the rotation speed of the recording medium reduces the consumption current of the spindle motor 518 since this reduces such losses as windage loss and friction loss by the bearing (not shown in the figure) which supports the recording medium.

If the rotation speed of the recording medium is lowered, data transfer speed via the storage interface 524 can also be lowered since the information write speed and read speed become lower. Accordingly, it is not necessary to keep high the data transfer capacity via the storage interface 524. If the disk controller 514 is provided with a function and command to re-adjust the data transfer rate, it is possible to reduce the current consumed by the storage interface 524. This makes it possible to further reduce the current consumed by the disk drive 504.

By the above-mentioned actions, the current consumed by the disk drive 504 is increasingly reduced until the voltage of the battery terminal 501 rises above the battery lower limit voltage. To reduce the consumption current, the current to drive the spindle motor 418 and/or the current to drive the VCM 420 may be limited as described with FIG. 1 in addition to the clock generator 531. Further, it is also possible to reduce the current consumed by another functional block unless the disk drive functionally deteriorates. Since these actions reduce the consumption current of the disk drive 504 and therefore the consumption current of the total application system, the voltage drop caused by the internal resistance 508 of the battery 500 decreases to raise the voltage of the battery terminal 501. Thus, the power supply voltage at the host system power supply terminal 503 and disk drive power supply terminal 505 is retained to allow the total application system to operate reliably.

Figure 6:
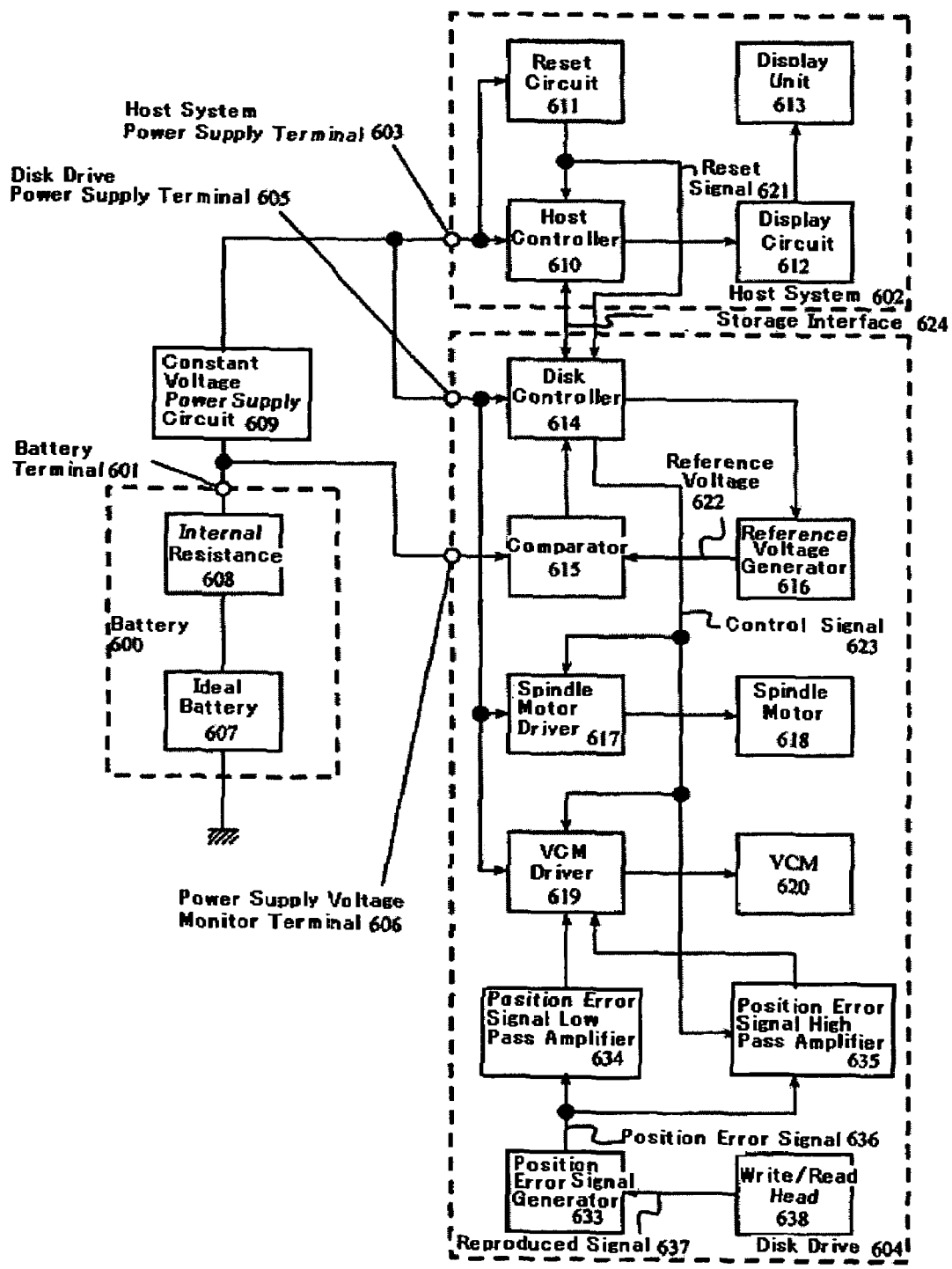
FIG. 6 is provided to explain an information recording and reproducing apparatus according to a fifth embodiment of the present invention.

FIG. 6 is provided to describe an information recording and reproducing apparatus and its application system according to a fifth embodiment of the present invention. This application system comprises: a battery 600 as a power source; a host system 602 which implements major functions of the application system; and a magnetic disk drive 604 which retains the data needed by the host system 602.

The output of the battery 600 is regulated by a constant voltage power supply circuit 609 to a predefined voltage which is lower than the battery's terminal voltage and needed by each section of the application system. This regulation absorbs the voltage fluctuation which occurs at the battery terminal 601 due to the progress of discharge from the battery 609, the change of the load current and the like. The regulated voltage is supplied to the host system 602 and the disk drive 604 respectively via the host system power supply terminal 603 and the disk drive power supply terminal 605. The host system 602 includes a host controller 610 which functionally controls the total application system. The application system in this embodiment is also assumed to be a video viewer where motion image compressed data stored in the disk drive 604 is read out to the host controller 610, expanded therein and output to a display unit 613 via a display circuit 612.

The host system 602 has a built-in reset circuit 611. The reset circuit 611 monitors the power supply voltage in the host system 602, namely, the output of the constant voltage power supply circuit 609. If the power supply voltage exceeds a predetermined voltage above which the host system can operate reliably, the reset circuit 611 immediately generates a reset signal 621. If motion image compressed data becomes necessary to create and display motion images, the host controller 610 issues a read command to a disk controller 614 in the disk drive 604 via a storage interface 624. Receiving the read command from the host controller 610, the disk controller 614 uses a control signal 623 to control a spindle motor driver 617 and a VCM driver 619. The spindle motor driver 617 is controlled so as to retain the spindle motor 618 at a proper rotation speed while the VCM driver 619 is controlled so as to properly orient the voice coil motor 620. By these actions, the read/write head in the disk drive 604 is located to an appropriate position on a recording medium to read motion image compressed data from the recording medium.

Positioning of the read/write head 638 by the VCM 620 is made based on a servo pattern recorded at certain intervals on the recording medium. A regenerative or reproduced signal 637 obtained by the read/write head 638 tracing the servo pattern is given to a position error signal generator 633. A position error signal 636 obtained by the position error signal generator 633 is fed back to the VCM driver 619 so that the position error signal 636 approaches a target value.

The position error signal 636 in this embodiment is given to a position error signal low pass amplifier 634 and a position error signal high pass amplifier 635 which respectively amplify low frequency components and high frequency components of the position error signal 636. Their outputs are separately input to the VCM driver 619. The position error signal high pass amplifier 635 is configured so that its gain can be changed by the control signal 623 from the disk controller 614. The VCM driver 619 adds the input from the position error signal low pass amplifier 634 and the input from the position error signal high pass amplifier 635 and uses the result to control the VCM 620. This method for generating the position error signal 636 and controlling the position of the read/write head 638 by using the position error signal 636 is widely known. Therefore, its detailed description is omitted here.

The retrieved motion image compressed data is given necessary processing, such as error detection and correction, by the disk controller 614 and conveyed to the host controller 610 again via the storage interface 624. In addition to the above-described operations as a motion image viewer, the host controller 610 issues a voltage setting command to the disk controller 614 in advance. The setting command specifies a battery lower limit voltage at which the disk drive 604 is to start limiting its consumption current. Based on the value specified by the command, the disk controller 614 sets the battery lower limit voltage to the reference voltage generator 616.

The voltage of the battery terminal 601, before regulated by the constant voltage power supply circuit 609, is conveyed into the disk drive 604 via a power supply voltage monitor terminal 606 and compared with the aforementioned reference voltage 622 by a comparator 615. The result is reported to the disk controller 514. Based on this result, the disk controller 614 generates the control signal 623 by which the gain of the position error signal high pass amplifier 635 is controlled so as not to let the voltage of the battery terminal 601 fall below the previously set lower limit voltage.

That is, if the battery lower limit voltage set by the aforementioned command is lower than the voltage at the power supply voltage monitor terminal 606 and battery terminal 601, the disk controller 614 does not give special instruction to the position error signal high pass amplifier 635 on its gain. However, if the current consumed by the host system 602 or the disk drive 604 increases due to reactivation or some other reason or the internal resistance 608 of the battery 600 increases due to the progress of discharge from the battery 600 or some other reason, the battery terminal 601 voltage may consequently fall to the battery lower limit voltage set by the aforementioned command. In this case, the disk controller 614 uses the control signal 623 to instruct the position error signal high pass amplifier 635 to lower its gain or cut off the output. Since this lowers the output of the position error signal high pass amplifier 635 and therefore reduces the current consumed by the VCM driver 619 to drive the VCM 620, it is consequently possible to reduce the total consumption current of the disk drive 604. In this case, since high frequency components of the drive current of the VCM 620 decrease, the position error of the read/write head 638 increases. However, the read/write head 638 is of such a currently common separate type that it has mutually separate read and write elements. Since the read track width (read head width) is narrower than the write track width (write head width), this position error does not matter as far as the gain reduction is appropriate.

The position error signal generator 633, the position error signal low pass amplifier 634 and the position error signal high pass amplifier 635 may be implemented digitally by using a DSP (Digital Signal Processor) or the like. In this case, since substantially narrowing the bandwidth of the position error signal 636 and VCM 620 drive current makes it possible to reduce the amount of processing, it is also possible to reduce the consumption current of the DSP by lowering the reference clock frequency supplied to the DSP or elongating its periodic operating intervals. To further reduce the consumption current, the current to drive the spindle motor 618, buffer memories (not shown in the figure) and the like may also be limited as described earlier in addition to the position error signal high pass amplifier 635 and the accompanying VCM driver 619. Further, it is also possible to reduce the current consumed by another functional block unless the disk drive functionally deteriorates.

Since these actions reduce the consumption current of the disk drive 604 and therefore the consumption current of the total application system, the voltage drop caused by the internal resistance 608 of the battery 600 decreases to raise the voltage of the battery terminal 601. Thus, the power supply voltage at the host system power supply terminal 603 and disk drive power supply terminal 605 is retained to allow the total application system to operate reliably. Note that although the position error signal 636 is divided into two bands in this embodiment, the present invention allows the signal to be divided into any number of bands.

As described so far, according to embodiments of the present invention, when a disk drive is being started or restarted, the disk drive is being spun up or the read/write head is seeking, the total consumption current of its application system can be controlled based on not the consumption current of the disk drive alone but the change of the power supply voltage which depends on the total consumption current of the application system. Thus, even if the output impedance of the power supply is high or the consumption current remarkably increases due to any other device other than the disk drive, it is possible to prevent the total application system from malfunctioning. In particular, if a battery is used as the power source, it is also possible to extend the effective operation time of the battery since the battery can be discharged exactly until the integrated discharge reaches an expected amount. In addition, if some kind of secondary battery is used, it is possible to extend the repetitive operation life of the battery since the memory effect can be minimized.

As apparent from the foregoing, the output capacitance of the power supply to the application system including the disk drive can be reduced, which is advantageous in terms of the system's initial cost and size. In addition, if a battery is used as the power source, the operation time is extended with the same capacity, which is advantageous in terms of the usability and system running cost.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. An information recording and reproducing apparatus, comprising:
   a medium drive unit which drives an information recording medium;
   a head which writes and reads information to and from the recording medium;
   positioning means for positioning the head to a desired position on the recording medium;
   an interface which exchanges information with a host system;
   a power supply terminal configured to receive operation energy supplied from an external constantly regulated voltage power supply;
   a monitor terminal which monitors a pre-regulated input voltage supplied to the constantly regulated voltage power supply;
   comparison means for comparing the voltage input to the monitor terminal with a preset voltage value; and
   control means for controlling a consumption current of an internal functional block of the information recording and reproducing apparatus based on the result of comparison by the comparison means, wherein said preset voltage value is set by the host system.

2. An information recording and reproducing apparatus according to claim 1, wherein said functional block is the positioning means and an operation time-out period of the positioning means can be set from the host system.

3. An information recording and reproducing apparatus according to claim 1, wherein said functional block is the interface and the maximum transfer rate of the interface can be set from the host system.

4. An information recording and reproducing apparatus according to claim 1, wherein said functional block is a buffer memory to temporally store information.

5. An information recording and reproducing apparatus according to claim 1, wherein said functional block is the positioning means, and a consumption current of the positioning means is controlled by the control means, so that a frequency bandwidth of the positioning operation by the positioning means is changed.

6. An information recording and reproducing apparatus according to claim 1, wherein said functional block is the positioning means, and a consumption current of the positioning means is controlled by the control means, so that accuracy of the positioning operation by the positioning means is changed.

7. An information recording and reproducing apparatus, comprising:
   a medium drive unit which drives an information recording medium;
   a head which writes and reads information to and from the recording medium;
   positioning means for positioning the head to a desired position on the recording medium;
   an interface which exchanges information with a host system;
   a power supply terminal configured to receive operation energy supplied from an external constantly regulated voltage power supply;
   a monitor terminal which monitors a pre-regulated input voltage supplied to the constantly regulated voltage power supply;
   comparison means for comparing the voltage input to the monitor terminal with a preset voltage value; and
   control means for controlling a consumption current of an internal functional block of the information recording and reproducing apparatus based on the result of comparison by the comparison means, wherein whether and how a consumption current of said functional block is being controlled is recognizable from the host system.

8. An information recording and reproducing apparatus, comprising:
   a medium drive unit which drives an information recording medium;
   a head which writes and reads information to and from the recording medium;
   a positioning mechanism which positions the head to a desired position on the recording medium;
   an interface which exchanges information with a host system;
   a power supply terminal which receives operation energy supplied from an external constantly regulated voltage power supply;
   a monitor terminal which monitors a pre-regulated input voltage supplied to the constantly regulated voltage power supply;
   a comparator which compares the voltage input to the monitor terminal with a preset voltage value; and
   a controller which controls a consumption current of a component of the information recording and reproducing apparatus based on the result of comparison by the comparator, wherein said preset voltage value is set by the host system.

9. An information recording and reproducing apparatus according to claim 8, wherein said component comprises the positioning mechanism and an operation time-out period of the positioning mechanism can be set from the host system.

10. An information recording and reproducing apparatus according to claim 8, wherein said component comprises the interface and a maximum transfer rate of the interface can be set from the host system.

11. An information recording and reproducing apparatus according to claim 8, wherein said component comprises a buffer memory to temporally store information.

12. An information recording and reproducing apparatus according to claim 8, wherein said component comprises the positioning mechanism, and a consumption current of the positioning mechanism is controlled by the controller so as to change a frequency bandwidth of the positioning operation by the positioning mechanism.

13. An information recording and reproducing apparatus according to claim 8, wherein said component is the positioning mechanism, and a consumption current of the positioning mechanism is controlled by the controller so as to change accuracy of the positioning operation by the positioning mechanism.

14. An information recording and reproducing apparatus according to claim 8, further comprising a position error signal generator configured to receive a regenerative signal from the head to produce a position error signal to be used to control the positioning mechanism.

15. An information recording and reproducing apparatus according to claim 8, further comprising a clock generator configured to control the frequency of a reference clock signal based on the preset voltage value so as to not let the voltage of the power supply terminal fall below a preset lower limit voltage, the reference clock signal being used to determine operation speeds of components of the apparatus and timings of signal exchanges between the components of the apparatus.

16. An information recording and reproducing apparatus according to claim 15, wherein the clock generator is adjustable to lower an oscillation frequency thereof to control the frequency of the reference clock signal so as to not let the voltage of the power supply terminal fall below the preset lower limit voltage.

* * * * *